United States Patent [19]

Nakagawa et al.

[11] 3,950,772
[45] Apr. 13, 1976

[54] SHUTTER FOR A CAMERA

[75] Inventors: Tadashi Nakagawa; Mitsuo Koyama; Eiichi Onda, all of Yotsukaido, Japan

[73] Assignee: Seiko Koki Kabushiki Kaisha, Japan

[22] Filed: Apr. 30, 1974

[21] Appl. No.: 465,590

[30] Foreign Application Priority Data
May 2, 1973 Japan................................ 48-52301

[52] U.S. Cl................ 354/234; 354/241; 354/242; 354/258
[51] Int. Cl.²........................ G03B 9/08; G03B 9/28
[58] Field of Search............ 354/234, 258, 242, 241

[56] References Cited
UNITED STATES PATENTS

| | | | |
|---|---|---|---|
| 3,208,365 | 9/1965 | Cooper, Jr. et al................. | 354/234 |
| 3,657,982 | 4/1972 | Uno et al............................ | 354/242 |
| 3,721,166 | 3/1973 | Yanagi et al....................... | 354/242 |
| 3,722,391 | 3/1973 | Kitai.................................... | 354/258 |

Primary Examiner—L. T. Hix
Assistant Examiner—Russell E. Adams, Jr.
Attorney, Agent, or Firm—Robert E. Burns; Emmanuel J. Lobato; Bruce L. Adams

[57] ABSTRACT

A shutter having two groups of shutter blades. One group of shutter blades opens the shutter and a second group of blades closes the shutter. A shutter-opening actuation member releasably locked by a locking pawl when the shutter is cocked, actuates the shutter-opening group of shutter blades for taking an exposure. A shutter-closing actuation member releasably locked by a second locking pawl actuates the shutter-closing group of shutter blades for completing the taking of an exposure. An electromagnet in an exposure control circuit is energized during the taking of an exposure and deenergized to control the exposure time and terminate the exposure. A control member that controls the release of the control member by its locking pawl is biased by a single spring. The single spring develops a force directed toward applying the control member to the electromagnet when the shutter is cocked and develops a force directed toward separating the control member from the electromagnet and releasing the actuation member and actuating it to close the shutter when the electromagnet is de-energized.

1 Claim, 2 Drawing Figures

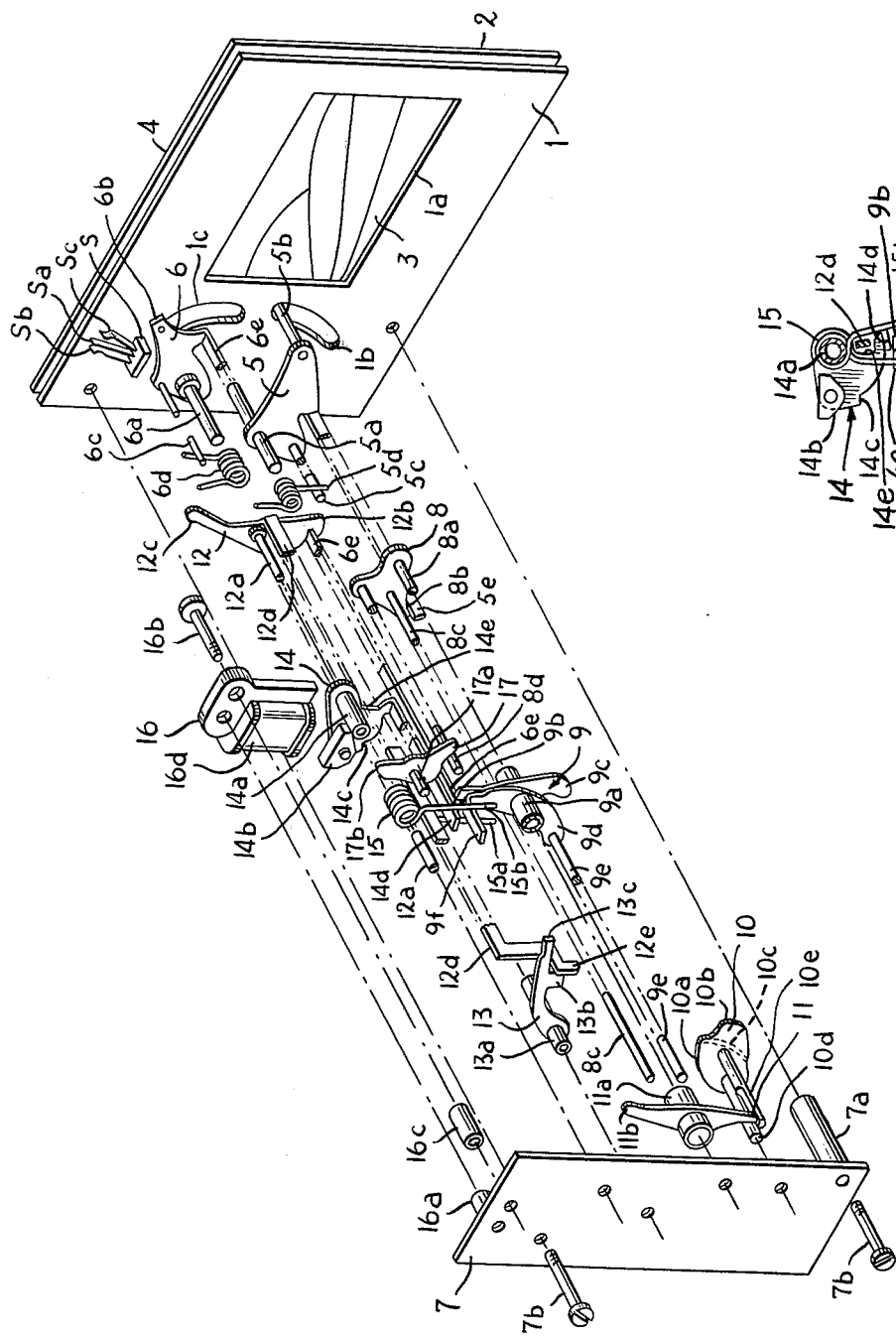

SHUTTER FOR A CAMERA

BACKGROUND OF THE INVENTION

This invention relates generally to cameras and more particularly to a new and improved shutter.

Camera shutters are known in which a shutter control element for terminating the exposure is attracted by an electromagnet of the exposure control circuit. The control element is biased into contact with the electromagnet by a spring when the shutter is cocked and biased away therefrom by another spring that overcomes the first-mentioned spring once the electromagnet is deenergized to terminate an exposure. The use of the two springs, one cancelling the other, results in instability of the control member.

SUMMARY OF THE INVENTION

It is a principal object of the present invention to provide a shutter in which the control element is stably controlled.

Another object is to provide a shutter in which a control element controlling the exposure is controlled and released by an electromagnet under control of an electronic control circuit, not shown, and a single spring.

The shutter according to the invention comprises a shutter-opening actuation member for opening the shutter and initiating the taking of an exposure. A locking pawl releasably locks the shutter-opening actuation member in a cocked position. A shutter-closing actuation member closes the shutter for completing an exposure under control of an electronic circuit that has an electromagnet that releases the control member. A pawl releasably locks the shutter-closing member. The control member actuates this latter pawl to release the shutter-closing member and thereby an exposure is terminated.

A single spring biases the control member toward engagement with the electromagnet when the shutter is in a cocked condition and actuates the control member away from the electromagnet. Thus a very stable operation of the control element obtains. Furthermore the shutter is less complex than those requiring two springs to control the control element.

BRIEF DESCRIPTION OF THE DRAWINGS

Other objects and advantages of the shutter according to the invention will appear from the following description of an example of the invention, and the novel features will be particularly pointed out in the appended claims.

FIG. 1 is an exploded perspective view of a shutter according to the invention.

FIG. 2 is a plan view of a detail of the shutter in FIG. 1.

DESCRIPTION OF THE PREFERRED EMBODIMENTS

In FIG. 1, a shutter-opening group 3 of blades for opening an exposure aperture 1a for use in exposing film to the light and a shutter-closing group 4 of blades (not shown) for closing the same are contained in the space formed in a well known method by a base plate 1 and a holder plate 2. The holder plate 2 has a film exposure window, not shown, coincident with the exposure aperture 1a of the base plate 1. At the left end of the base plate 1 is attached an opening actuation member 5 mounted so that it pivots on a shaft 5a. A projection or finger 5b on the tip of the actuation member actuates shutter-opening blade group 3 through a slot 1b in the base plate 1. It is connected to the shutter-opening blade group 3 by a well-known method. A finger or projection 5c mounted on the other end biases the opening actuation member 5 in a counterclockwise direction by action of an opening drive spring 5d. Similarly, a closing-operation member 6 is supported on a shaft 6a at the left end of the base plate 1 and is connected to the closing blade group 4 through a slot 1c of the base plate 1 by a finger or projection 6b which actuates the shutter-closing blade group 4, and a lateral finger 6c biases the shutter-closing member 6 in a clockwise direction due to the action of a closing drive spring 6d.

A control part mounting plate 7 for fixing the free end of the drive spring and for attaching the shutter control parts is supported by a support 7a and fixed firmly on the left end part of the base plate 1 with a set screw 7b. On the mounting plate 7 is supported a first locking member 8 that can pivot on a support 8a. It locks a riser bent part 5e of the opening actuation member 5 in a state ready for cocking the shutter by means of a locking step part 8b. Two fingers or lateral extensions 8c, 8d, on the locking member 8 are biased by a left-turning force applied by a spring, not shown in the drawing.

A closing pawl 9 is disposed on the shaft 8a of the first locking member 8, and a shaft 9a couples two sheets of plates. At an end pawl part 9b of one plate, the riser bent part 6e of the closing actuation member 6 is locked ready for cocking the shutter, and the other end 9c is formed as an operating part. At an end 9d of the other plate is set an actuating finger 9e and the other end 9f is formed as a bent part for operation by a spring as later explained.

A set cam 10 is composed of a plate having two cam parts 10a, 10b and also of a plate having a third cam part 10c. The cam plates are coupled with each other by a shaft 10d and fitted capable of turning round the shaft 10d supported on the mounting plate 7.

It is also biased by a left turning force applied by a spring, not shown in the drawings, and is held in a cocked state with the locking projection or finger 10e being locked by the set cam pawl 11. The pawl 11 is supported by a shaft 11a to be inlaid onto the shaft 9a of said closing pawl 9 and provided with an operating part 11b different from the locking part of the set cam 10 and also biased by a right turning force applied by a spring not shown in the drawing. A switch operating member 12 provided with a pawl part 12b which engages with the riser bent part 6e of the closing member, is pivoted on the mounting plate 7 by a shaft 12a in order to lock closing actuation member 6 in a cocked state. The switch operating member 12 is provided with a lateral extension 12c and a bent part 12d for actuating the switch s of the electronic circuit for exposure control, not shown in the drawing, and when it is in a shutter-cocking state, the pawl part 12b locks the tip part 12e of the bent part 12d at a first position which does not lock the riser bent part 6e of said closing actuation member 6, through a second locking member 13 and is biased in a right turning direction by a spring not shown in the drawing. The second locking member 13 is pivoted and capable of turning around shaft 13a. It is provided with a pawl part 13b and is provided with pawl-and-release operating part 13c for locking the actuation member 12 and is biased by a right turning force applied by a spring, not shown.

A control member 14 supported by a shaft 14a disposed on the shaft 12a of the operating member 12, is fitted with a magnetic member 14b capable of turning at its end and is provided with a locking step 14c, bent part 14d and a concave part 14e.

A spring 15 is disposed on the shaft 14a. The left end part 15a and a right end part 15b of the spring 15 are provided respectively capable of engaging with the bent part 9f of the closing pawl 9 and the bent part 14d of the control member 14. An electromagnet 16 is held by a support 16a fixed on the mounting plate 7 by a mounting screw 16b extending through a washer 16c.

A winding 16d of the electromagnet 16 is connected to the electronic circuit for exposure control, not shown, and generates a magnetic force for attracting the magnetic member 14b of said control member 14 by an output taken from the exposure control circuit. A control pawl 17 is biased by a right turning force and supported on the mounting plate 7 by a shaft 17a together with the second locking member 13. By means of the pawl part 17b, it locks the locking step 14c of the control member 14 when the shutter is in a cocked state, the other of which is located at an actuating area of the extension 8d of the first locking pawl 8.

The switch s of the electronic circuit is composed of electrically insulated three contact pieces Sa, Sb and Sc. When the shutter is in a cocked state, the contact piece Sa is pushed in toward the left in contact with the contact piece Sb by switch-actuating projection 12c of the switch operating member 12, and when the projection 12c moves toward the right, the contact piece Sa comes into contact with Sc by its own bias and connects a power supply source to the electronic circuit, not shown.

FIG. 2 is a plan view showing the relative conditions of the switch actuating member 12, control member 14, closing pawl 9 and spring 15 before release of the shutter.

Next, an explanation is made on how it works.

The operating part 13c of the second locking member 13 is turned counterclockwise automatically upon releasing of a camera release, not shown, and the tip locking part 12e of the switch operating member 12 locked by the pawl part 13b is released. Then the third locking member 12 starts turning clockwise from its first position as shown when its bent part 12d is operated by the spring, not shown. Switch operating extension 12c then releases the pushing of the contact piece Sa by the turning thereof and breaks a contact with the contact piece Sb, thus setting the electronic circuit not shown ready for actuation. When it turns further, contact Sa comes into contact with contact piece Sc, by action of which a power supply source is then connected to the electronic circuit. Followed by continuous turning, synchronous contacts, not shown in the drawing, complete closing, thereby a flash circuit is formed. When the turning advances more, the pawl part 12b of the operating member 12 moves to its second position where it is to be engaged with the riser bent part 6e of the closing actuation member 6, and just before the action is completed, tip locking part 12e is then engaged with the operating part 11b of the set cam pawl 11 and allows the set cam pawl 11 to turn counterclockwise against its spring bias, and bent part 12d stops upon the recess part 14e of the control member 14. Since the set cam pawl 11 is caused to turn counterclockwise around shaft 11a and releases the locking finger 10e of the set cam 10 being locked at the other end, the set cam 10 turns counterclockwise around shaft 10d by a spring not shown. At a charging position of the set cam 10, the third cam 10c presses on the operating part 9c of the closing pawl 9, then the pawl part 9b locks the riser bent part 6e of the closing actuation member 6, and holds the closing pawl 9 in the direction such that bent part 9f presses on the left end 15a of the spring 15. Just before the set cam 10 is released, the right end 15b of the spring 15 pushes on the bent part 14d of the control member 14 and also pushes on the control member 14 in a direction such that magnetic member 14b is in contact with electromagnet 16. When the set cam 10 is turned counterclockwise, the third cam part 10c then releases a press-on force of the operating part 9c of the closing pawl 9 at an early time, and when turning continues, the first cam part 10a pushes on the actuating finger or projection 9e of the closing pawl 9, causing the closing pawl 9 to turn clockwise. By this turning, the bent part 9f releases a press-on force of the left end 15a of the spring 15, and in turn, while the right end 15b is pushed toward the right, the pawl part 9b of the closing pawl 9 releases the riser bent part 6e of the closing actuation member 6. While the right end 15b of the spring 15 is being pushed toward the right, its left end 15a is engaged with the bent part 14d of the control member 14 thereby pushing the control member 14 toward the direction in which it turns around shaft 14a, but as the power switch s for operating the electronic circuit, not shown, is already closed between Sa and Sc, the electromagnet 16 attracts and holds the magnet member 14b of the control member 14, and then the control member 14 will be held in an energized state by a left turning force applied by the left end 15a of said spring 15. Meantime, when the pawl part 9b of the closing panel 9 releases the riser bent part 6e of closing actuation member 6, the member 6 is turned clockwise by the drive spring 6d and locked by the pawl part 12b of the switch operating member 12 predisplaced to the actuating area of said riser bent part 6e, causing the shutter-closing blade group 4 to be ready for operation at a start position for closing.

When the set cam 10 turns further counterclockwise the second cam part 10b pushes up the finger or projection 8c of the first locking member 8 and causes the first locking member 8 to turn clockwise around shaft 8a against its spring force, not shown. At an early stage of turning of the first locking member 8 the locking step part 8b releases the riser bent part 5e of the opening actuation member 5, and therefore, the opening actuation member 5 turns around shaft 5a clockwise by the force of the opening drive spring 5d and causes the opening blade group 3 to move toward the lower portion of aperture part 1a from the state shown in the FIG. 1 by means of the lower projection or finger 5b quickly opening the aperture 1a for starting a film exposure to the light. Then by subsequent turning of the first locking member 8, the second projection or finger 8d pushes on the control pawl 17 and causes it to turn around shaft 17a counterclockwise against the force of its spring which is not shown. The pawl part 17b of the pawl 17 is, when in a cocked state as shown, at a position for locking the locking step 14c of control member 14, but it is caused to turn counterclockwise to a position for release of its locking condition by a pushing of the second projection or finger 8d. However, if the exposure time controllable by the electronic control circuit is comparatively long and if current flow through the electromagnet 16 is interrupted, after the said control pawl 17 has turned counterclockwise, the control member 14 is then moved away from the electromagnet by the biasing spring 15 when the electromagnet 16 is de-energized and through the recess 14e, and actually as one unit together with the operating member 12, it turns counterclockwise around the shaft 14a supported on mounting plate 7 by the shaft 12a of the switch operating member 12, thus releasing the riser bent part 6e of the closing operation member by pawl part 12b. The closing actuation member 6 is quickly turned clockwise by the spring 6d, and by the lower projection 6b, on the end, it displaces the closing blade group 4 from above the aperture 1a as shown to a position covering the aperture 1a, thereby closing the aperture 1a. On the other hand, if time controllable by the electronic circuit is short (for example, 1/3000 sec.), and if current through the electromagnet 16 is interrupted prior to releasing the locking step 14c as the pawl 17 is turned counterclockwise, the control member 14 is caused to turn counterclockwise by the spring 15 because the electromagnet is already de-energized and having locked the locking step 14c once by the pawl part 17b, it makes an exposure operation of the shutter at such a speed that may substantially not cause a non-uniform exposure on the film (for example 1/1000 sec.), and consequently, it is released from an engagement with the pawl part 17b by the pawl 17 and turned counterclockwise, accompanied with the switch operating member 12 through the recess 14e, thus releasing locking of the closing actuation member 6 and completing the exposure operation.

The set cam 10 turns counterclockwise further, and completes operation when it engages against a stop, not shown. The switch operating member 12 is then turned counterclockwise by the control member 14, and thereby opens the synchronous contacts, not indicated in the drawing, and when changing the contact position of the contact piece Sa with the contact piece Sc over to that with contact piece Sb by switch actuation protuberance 12c, the power switch for the electronic control circuit is disconnected, the circuit being in a state of exposure completion again, and at the same time, the end locking 12e of the said operating member 12 is locked by the pawl part 13b of the second locking member 13. Thus the operating member 12 is returned to its first position again, completing operation.

The spring 15 is constituted not to exert action on the closing pawl 9 and control member 14 at the time when the control member 14 completes a counterclockwise movement.

Although the above-mentioned embodiment is constituted such that the trigger switch and power switch in the control circuit are actuated by the operating member 12, it is also possible that the power switch is actuated by the second locking member 13 or directly by the releasing member of the camera.

To cock the shutter again after completion of an exposure operation as mentioned above, the set cam 10 is turned clockwise by a well known mechanism, not shown, against the force of a spring not indicated in the drawing, and after pushing on the operating part 9c of the closing pawl 9 by the third cam part 10c and making the pawl 9 turn counterclockwise to a position shown in FIG. 1, allows locking finger 10e to be locked by the set cam pawl 11, and simultaneously, the opening and closing operation members, 5, 6 turn counterclockwise with blade groups overlapping in layers by a means not shown. The opening actuation member 5 is turned to a position where the riser bent part 5e is locked by the first locking member 8, and the closing actuating member 6 is turned to a position to be locked by the pawl part 9b of the closing pawl 9 beyond a start position at which the riser bent part 6e makes a closing action (a position at which it engages with the pawl part 12b of the switch operating member). Thus, cocking is completed.

It is the same as above-mentioned when cocking is completed, the left end part 15a of spring 15 is pushed toward the left by the bent part 9f and the right end part 15b energizes the bent part 14d of the control member 14 to turn clockwise. Moreover, though not shown in the drawing, but it is a matter of common knowledge that just before cocking is completed, the pawl part 9b of closing pawl 9 and the riser bent part 6e of the closing actuation member 6 are constituted not to act on each other.

According to the present device as set forth above, it is constituted such: the pre-travelling member to be set free by the shutter release and to travel prior to start of exposure actuation makes the control member come into pressed contact through a spring under the action of the electromagnet controllable by the electronic control circuit while the shutter is being cocked and the spring for performing said pressed contact action acts to move the control member apart from the electromagnet as shutter actuation proceeds. Namely, as compared with the case of hitherto-used devices where two springs are applied for effecting the pressed contact against the electromagnet and the pulling-apart therefrom construction is more simplified because the actions are made by a single spring and no cancelling effect is exerted. In addition, the control member can always have stabilized, reliable operation by means of a single spring. To wit, a pulling-apart force of the control member controllable by an attractive force of the electromagnet is not subjected to an abrupt change comparatively, and accordingly, it will be made possible to achieve an effect of stabilized operation, etc., and the effects to be bought forth therefrom will remarkably grow larger.

What I claim and desire to secure by Letters Patent:

1. A shutter comprising a shutter-opening actuation member actuatable for opening the shutter to take an exposure, a first locking pawl releasably locking said shutter-opening actuation member, a shutter-closing actuation member actuatable for closing the shutter, a second locking pawl releasably locking said shutter-closing actuation member, an electromagnet energizable while an exposure is being taken and de-energized to terminate the exposure, a control member for controlling release of said shutter-closing actuation member for closing the shutter when the electro-magnet is de-energized, said control member having means attractable by said electromagnet when energized, a pre-travelling member pivotally mounted for rotation and rotatably driven before initiation of an exposure when the shutter is released, and means comprising a single spring and said pretravelling member developing a spring force in a direction directed by said pretravelling member toward applying said control member into contact with said electromagnet when the shutter is cocked and developing a spring force by said spring to bias the control member in a direction away from said electromagnet by said pretravelling member and toward a direction for releasing said second locking pawl and actuating said shutter-closing actuation member when the shutter is released.

* * * * *